United States Patent
Arman et al.

[11] Patent Number: 6,125,656
[45] Date of Patent: Oct. 3, 2000

[54] CRYOGENIC RECTIFICATION METHOD FOR PRODUCING NITROGEN GAS AND LIQUID NITROGEN

[75] Inventors: Bayram Arman; Dante Patrick Bonaquist, both of Grand Island; Joseph Alfred Weber, Cheektowaga; John Harold Ziemer, Youngstown; Arun Acharya, East Amherst; Mohannad Abdul-Aziz Rashad, Buffalo, all of N.Y.

[73] Assignee: Praxair Technology, Inc., Danbury, Conn.

[21] Appl. No.: 09/432,214

[22] Filed: Nov. 3, 1999

[51] Int. Cl.[7] .................................................. F25B 25/00
[52] U.S. Cl. ............................................................ 62/647
[58] Field of Search ...................................... 62/647, 912

[56] References Cited

U.S. PATENT DOCUMENTS

| | | | |
|---|---|---|---|
| 4,966,002 | 10/1990 | Parker et al. | 62/31 |
| 5,309,721 | 5/1994 | Rathbone | 62/39 |
| 5,385,024 | 1/1995 | Roberts et al. | 62/25 |
| 5,664,438 | 9/1997 | Bonaquist et al. | 62/645 |

*Primary Examiner*—William Doerrler
*Assistant Examiner*—Malik N. Drake
*Attorney, Agent, or Firm*—Stanley Ktorides

[57] ABSTRACT

A cryogenic rectification method wherein both nitrogen gas and liquid are efficiently produced from air employing one or two columns wherein refrigeration to drive the cryogenic separation is provided by a, preferably closed loop, multicomponent refrigerant fluid refrigeration circuit.

10 Claims, 4 Drawing Sheets

CRYOGENIC RECTIFICATION METHOD FOR PRODUCING NITROGEN GAS AND LIQUID NITROGEN

TECHNICAL FIELD

This invention relates generally to the cryogenic rectification of feed air and, more particularly, to the cryogenic rectification of feed air to produce nitrogen.

BACKGROUND ART

In the production of nitrogen gas by the cryogenic rectification of feed air, the refrigeration necessary to drive the separation is generally supplied by the turboexpansion of one or more process streams, such as a portion of the feed air. Such a turboexpansion system is effective but very energy intensive. Often the production of liquid nitrogen is desired in addition to the nitrogen gas. Such a system imposes a significantly higher refrigeration load on the overall cryogenic air separation plant because a significant amount of refrigeration exits the plant with the liquid nitrogen. This problem increases as the relative amount of nitrogen recovered as liquid increases. A system which can produce both nitrogen gas and liquid nitrogen using less energy than is heretofore required would be highly desirable.

Accordingly, it is an object to provide a cryogenic air separation method for the production of both nitrogen gas and liquid nitrogen which enables the production of both products with reduced energy usage compared with known methods.

SUMMARY OF THE INVENTION

The above and other objects, which will become apparent to one skilled in the art upon a reading of this disclosure, are attained by the present invention, one aspect of which is:

A method for the production of nitrogen gas and liquid nitrogen by the cryogenic rectification of feed air comprising:

(A) compressing a multicomponent refrigerant fluid, cooling the compressed multicomponent refrigerant fluid, expanding the cooled, compressed multicomponent refrigerant fluid, and warming the expanded multicomponent refrigerant fluid by indirect heat exchange with said cooling compressed multicomponent refrigerant fluid and also with feed air to produce cooled feed air;

(B) passing the cooled feed air into a cryogenic rectification column and separating the feed air by cryogenic rectification within the cryogenic rectification column into nitrogen-enriched vapor and oxygen-enriched liquid;

(C) recovering a first portion of the nitrogen-enriched vapor as product nitrogen gas;

(D) condensing a second portion of the nitrogen-enriched vapor to produce nitrogen-enriched liquid; and (E) recovering at least some of the nitrogenenriched liquid as product liquid nitrogen.

Another aspect of the invention is:

A method for the production of nitrogen gas and liquid nitrogen by the cryogic rectification of feed air comprising:

(A) compressing a multicomponent refrigerant fluid, cooling the compressed multicomponent refrigerant fluid, expanding the cooled, compressed multicomponent refrigerant fluid, and warming the expanded multicomponent refrigerant fluid by indirect heat exchange with said cooling compressed multicomponent fluid and also with feed air to produce cooled feed air;

(B) passing the cooled feed air into a first cryogenic rectification column and separating the feed air by cryogenic rectification within the first cryogenic rectification column into nitrogen-enriched vapor and oxygen-enriched fluid;

(C) passing oxygen-enriched fluid into a second cryogenic rectification column and separating the oxygen-enriched fluid within the second cryogenic rectification column by cryogenic rectification into nitrogen-richer fluid and oxygen-richer fluid;

(D) recovering at least some of the nitrogen-richer fluid as product liquid nitrogen; and (E) recovering at least some of at least one of the nitrogen-enriched vapor and nitrogen-richer fluid as product nitrogen gas.

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook, fifth edition, edited by R. H. Perry and C. H. Chilton, McGraw-Hill Book Company, New York, Section 13, The Continuous Distillation Process.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the more volatile component(s) in the vapor phase and thereby the less volatile component(s) in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases can be adiabatic or nonadiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is a rectification process carried out at least in part at temperatures at or below 150 degrees Kelvin (K).

As used herein, the term "indirect heat exchange" means the bringing of two fluid streams into heat exchange relation without any physical contact or intermixing of the fluids with each other.

As used herein, the term "expansion" means to effect a reduction in pressure.

As used herein, the term "product nitrogen gas" means a gas having a nitrogen concentration of at least 99 mole percent.

As used herein, the term "product liquid nitrogen" means a liquid having a nitrogen concentration of at least 99 mole percent.

As used herein, the term "feed air" means a mixture comprising primarily oxygen and nitrogen, such as ambient air.

As used herein, the terms "upper portion" and "lower portion" mean those sections of a column respectively above and below the mid point of the column.

As used herein, the term "variable load refrigerant" means a multicomponent fluid, i.e. a mixture of two or more components, in proportions such that the liquid phase of those components undergoes a continuous and increasing temperature change between the bubble point and the dew point of the mixture. The bubble point of the mixture is the temperature, at a given pressure, wherein the mixture is all in the liquid phase but addition of heat will initiate formation of a vapor phase in equilibrium with the liquid phase. The dew point of the mixture is the temperature, at a given pressure, wherein the mixture is all in the vapor phase but extraction of heat will initiate formation of a liquid phase in equilibrium with the vapor phase. Hence, the temperature region between the bubble point and the dew point of the mixture is the region wherein both liquid and vapor phases coexist in equilibrium. In the practice of this invention the temperature differences between the bubble point and the dew point for the multicomponent refrigerant fluid is at least 10° K., preferably at least 20° K. and most preferably at least 50° K.

As used herein, the term "fluorocarbon" means one of the following: tetrafluoromethane ($CF_4$), perfluoroethane ($C_2F_6$), perfluoropropane ($C_3F_8$), perfluorobutane ($C_4F_{10}$), perfluoropentane ($C_5F_{12}$), perfluoroethene ($C_2F_4$), perfluoropropene ($C_3F_6$), perfluorobutene ($C_4F_8$), perfluoropentene ($C_5F_{10}$), hexafluorocyclopropane (cyclo—$C_3F_6$) and octafluorocyclobutane (cyclo—$C_4F_8$)

As used herein, the term "hydrofluorocarbon" means one of the following: fluoroform ($CHF_3$), pentafluoroethane ($C_2HF_5$), tetrafluoroethane ($C_2H_2F_4$), heptafluoropropane ($C_3HF_7$), hexafluoropropane ($C_3H_2F_6$), pentafluoropropane ($C_3H_3F_5$), tetrafluoropropane ($C_3H_4F_4$), nonafluorobutane ($C_4HF_9$), octafluorobutane ($C_4H_2F_8$), undecafluoropentane ($C_5HF_{11}$), methyl fluoride ($CH_3F$), difluoromethane ($CH_2F_2$), ethyl fluoride ($C_2H_5F$), difluoroethane ($C_2H_4F_2$), trifluoroethane ($C_2H_3F_3$), difluoroethene ($C_2H_2F_2$), trifluoroethene ($C_2HF_3$), fluoroethene ($C_2H_3F$), pentafluoropropene ($C_3HF_5$), tetrafluoropropene ($C_3H_2F_4$), trifluoropropene ($C_3H_3F_3$), difluoropropene ($C_3H_4F_2$), heptafluorobutene ($C_4HF_7$), hexafluorobutene ($C_4H_2F_6$) and nonafluoropentene ($C_5HF_9$)

As used herein, the term "fluoroether" means one of the following: trifluoromethyoxy-perfluoromethane ($CF_3$—O—$CF_3$), difluoromethoxy-perfluoromethane ($CHF_2$—O—$CF_3$), fluoromethoxy-perfluoromethane ($CH_2F$—O—$CF_3$), difluoromethoxy-difluoromethane ($CHF_2$—O—$CHF_2$), difluoromethoxy-perfluoroethane ($CHF_2$—O—$C_2F_5$), difluoromethoxy-1,2,2,2—tetrafluoroethane ($CHF_2$—O—$C_2HF_4$), difluoromethoxy—1,1,2,2—tetrafluoroethane ($CHF_2$—O—$C_2HF_4$), perfluoroethoxy-fluoromethane ($C_2F_5$—O—$CH_2F$), perfluoromethoxy-1,1,2-trifluoroethane ($CF_3$—O—$C_2H_2F_3$), perfluoromethoxy-1,2,2-trifluoroethane ($CF_3O$—$C_2H_2F_3$), cyclo-1,1,2,2-tetrafluoropropylether (cyclo—$C_3H_2F_4$—O—), cyclo-1,1,3,3-tetrafluoropropylether (cyclo—$C_3H_2F_4$—O—), perfluoromethoxy-1,1,2,2-tetrafluoroethane ($CF_3$—O—$C_2HF_4$), cyclo-1,1,2,3,3-pentafluoropropylether (cyclo—$C_3H_5$—O—), perfluoromethoxy-perfluoroacetone ($CF_3$—O—$CF_2$—O—$CF_3$), perfluoromethoxy-perfluoroethane ($CF_3$—O—$C_2F_5$), perfluoromethoxy-1,2,2,2-tetrafluoroethane ($CF_3$—O—$C_2HF_4$), perfluoromethoxy-2,2,2-trifluoroethane ($CF_3$—O—$C_2H_2F_3$), cyclo-perfluoromethoxy-perfluoroacetone (cyclo—$CF_2$—O—$CF_2$—O—$CF_2$—) and cyclo-perfluoropropylether (cyclo—$C_3F_6$—O)

As used herein, the term "atmospheric gas" means one of the following: nitrogen ($N_2$), argon (Ar), krypton (Kr), xenon (Xe), neon (Ne), carbon dioxide ($CO_2$), oxygen ($O_2$), carbon monoxide (CO), hydrogen ($H_2$) and helium (He)

As used herein, the term "non-toxic" means not posing an acute or chronic hazard when handled in accordance with acceptable exposure limits.

As used herein, the term "non-flammable" means either having no flash point or a very high flash point of at least 600° K.

As used herein, the term "low-ozone-depleting" means having an ozone depleting potential less than 0.15 as defined by the Montreal Protocol convention wherein dichlorofluoromethane ($CCl_2F_2$) has an ozone depleting potential of 1.0.

As used herein, the term "non-ozone-depleting" means having no component which contains a chlorine, bromine or iodine atom.

As used herein, the term "normal boiling point" means the boiling temperature at 1 standard atmosphere pressure, i.e. 14.696 pounds per square inch absolute.

DETAILED DESCRIPTION

Figure 1:
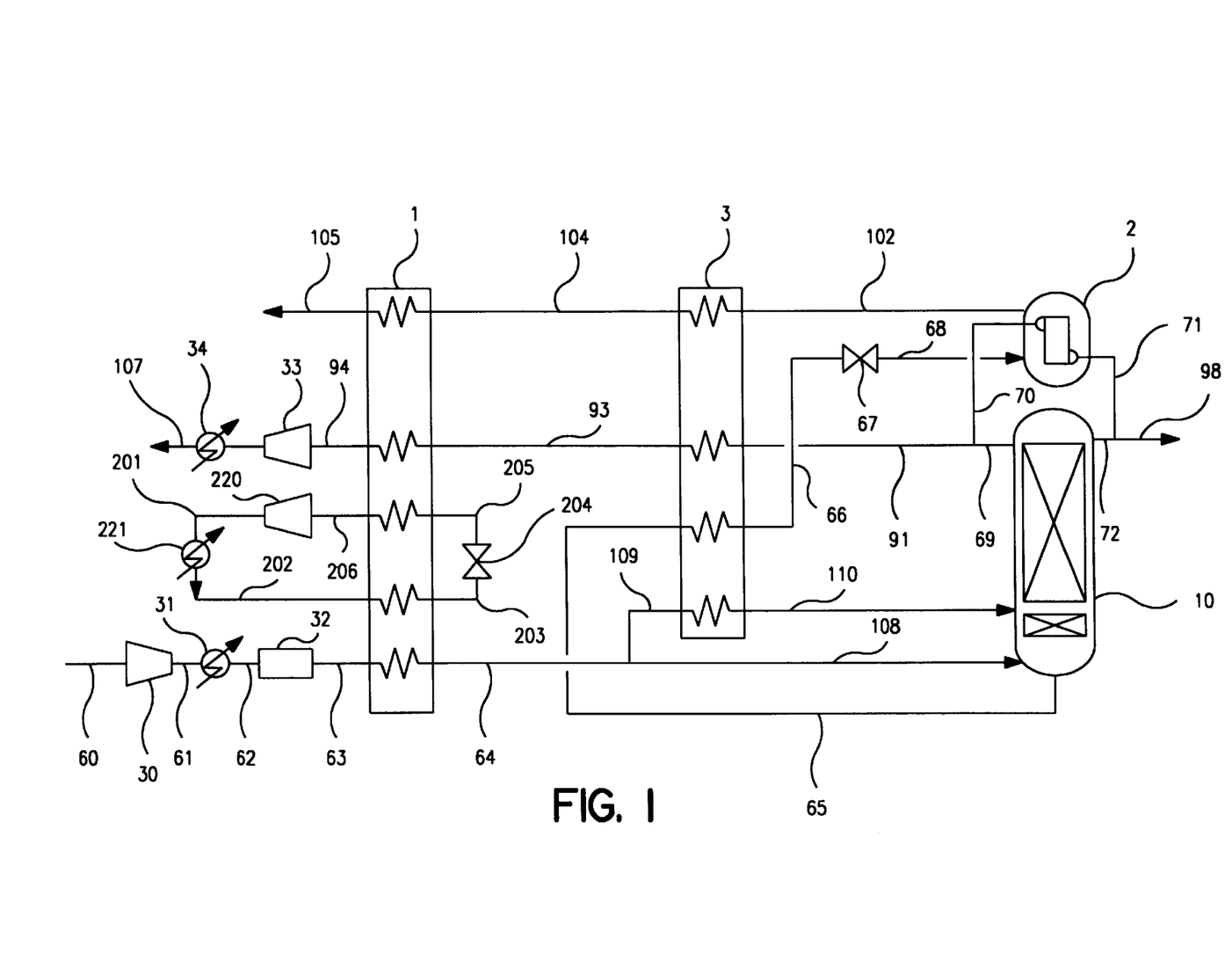
FIG. 1 is a schematic representation of one preferred embodiment of the invention wherein one cryogenic rectification column is used to produce the nitrogen gas and liquid nitrogen.

The invention will be described in detail with reference to the Drawings. Referring now to FIG. 1, feed air 60 is compressed by a passage through compressor 30 to a pressure generally within the range of from 40 to 200 pounds per square inch absolute (psia). Resulting compressed feed air 61 is cooled of the heat of compression in aftercooler 31 and resulting feed air stream 62 is cleaned of high boiling impurities such as water vapor, carbon dioxide and hydrocarbons by passage through purifier 32. Purified feed air stream 63 is then cooled by passage through main heat exchanger 1 to produce cooled feed air stream 64.

The feed air is cooled by returning product and waste streams and by refrigeration generated by a multicomponent refrigerant fluid. Multicomponent refrigerant fluid in stream 206 is compressed by passage through recycle compressor 220 to a pressure generally within the range of from 60 to 600 psia to produce compressed multicomponent refrigerant fluid 201. The compressed multicomponent refrigerant fluid is cooled of the heat of compression by passage through aftercooler 221 and may be partially condensed. The multicomponent refrigerant fluid in stream 202 is then passed through main heat exchanger 1 wherein it is further cooled, and is at least partially condensed, and may be completely condensed. The cooled, compressed multicomponent refrigerant fluid 203 is then expanded or throttled through valve 204. The throttling preferably partially vaporizes the multicomponent refrigerant fluid, cooling the fluid and generating refrigeration. For some limited circumstances, depending on heat exchanger conditions, the compressed fluid 203 may be subcooled liquid prior to expansion and may remain as liquid upon initial expansion. Subsequently, upon warming in the heat exchanger, the fluid will have two phases. The pressure expansion of the fluid through a valve provides refrigeration by the Joule-Thomson effect, i.e. lowering of the fluid temperature due to pressure expansion at constant enthalpy. However, under some circumstances, the fluid temperature may be lowered due to work expansion.

Refrigeration bearing multicomponent two phase refrigerant fluid stream 205 is then passed through heat exchanger 1 wherein it is warmed and completely vaporized thus serving by indirect heat exchange to cool stream 202 and also to transfer refrigeration into the process streams within the heat exchanger, including feed air stream 63, thus passing refrigeration generated by the multicomponent refrigerant fluid refrigeration circuit into the cryogenic rectification plant to sustain the separation process. The resulting warmed multicomponent refrigerant fluid in vapor stream 206 is then recycled to compressor 220 and the refrigeration cycle starts anew. In the multicomponent refrigerant fluid refrigeration cycle, while the high pressure mixture is condensing, the low pressure mixture is boiling against it, i.e. the heat of condensation boils the low pressure liquid. At each temperature level, the net difference between the vaporization and the condensation provides the refrigeration. For a given refrigeration component combination, mixture composition, flowrate and pressure levels determine the available refrigeration at each temperature level. In FIG. 1 there is illustrated the preferred embodiment wherein the refrigeration bearing multicomponent fluid serves to cool the feed air without any intervening heat transfer fluid. It is understood however that the multicomponent refrigerant fluid could cool another fluid which would then be used to cool the feed air stream.

Cooled feed air stream is divided into major portion 108 which is passed into cryogenic rectification column 10, and into minor portion 109 which is at least partially condensed by passage through heat exchanger 3 and then passed as stream 110 into column 10.

Cryogenic rectification column 10 is operating at a pressure generally within the range of from 30 to 200 psia. Within cryogenic rectification column 10 the feed air is separated by cryogenic rectification into nitrogen-enriched vapor and oxygen-enriched liquid. Nitrogen-enriched vapor is withdrawn from the upper portion of column 10 in stream 69. A first portion 91 of the nitrogen-enriched vapor is warmed by passage through heat exchanger 3 and resulting stream 93 is further warmed by passage through main heat exchanger 1 to produce stream 94 for recovery as product nitrogen gas. FIG. 1 illustrates the embodiment wherein the nitrogen gas in stream 94 is compressed by passage through compressor 33 and resulting compressed nitrogen gas stream 106 is cooled of the heat of compression by passage through aftercooler 34 and recovered in stream 107 as elevated pressure product nitrogen gas, typically at a pressure within the range of from 50 to 300 psia. The product nitrogen gas of this invention may have a purity of up to 99.9 mole percent nitrogen or more.

A second portion 70 of the nitrogen-enriched vapor is passed to top condenser 2 wherein it is condensed to produce nitrogen-enriched liquid which is withdrawn from top condenser 2 in stream 71. At least some of the nitrogen-enriched liquid is recovered in stream 98 as product liquid nitrogen. Nitrogen-enriched liquid in stream 72 may also be passed into column 10 as reflux. The product liquid nitrogen of this invention may have a purity of up to 99.9 mole percent nitrogen or more.

Oxygen-enriched liquid is withdrawn from the lower portion of column 10 in stream 65 and subcooled by passage through heat exchanger 3. Resulting subcooled oxygen-enriched liquid 66 is throttled through valve 67 and then as stream 68 is passed into top condenser 2 wherein it is vaporized by indirect heat exchange with nitrogen-enriched vapor to effect the aforesaid condensation of the nitrogen-enriched vapor to nitrogen-enriched liquid. Resulting oxygen-enriched vapor is withdrawn from top condenser 2 in stream 102, warmed by passage through heat exchanger 3, resulting stream 104 further warmed by passage through main heat exchanger 1, and then removed from the system as waste stream 105. Although not illustrated in FIG. 1, a portion of the oxygen-enriched vapor which forms the waste stream may be used to regenerate purifier 32.

Figure 2:
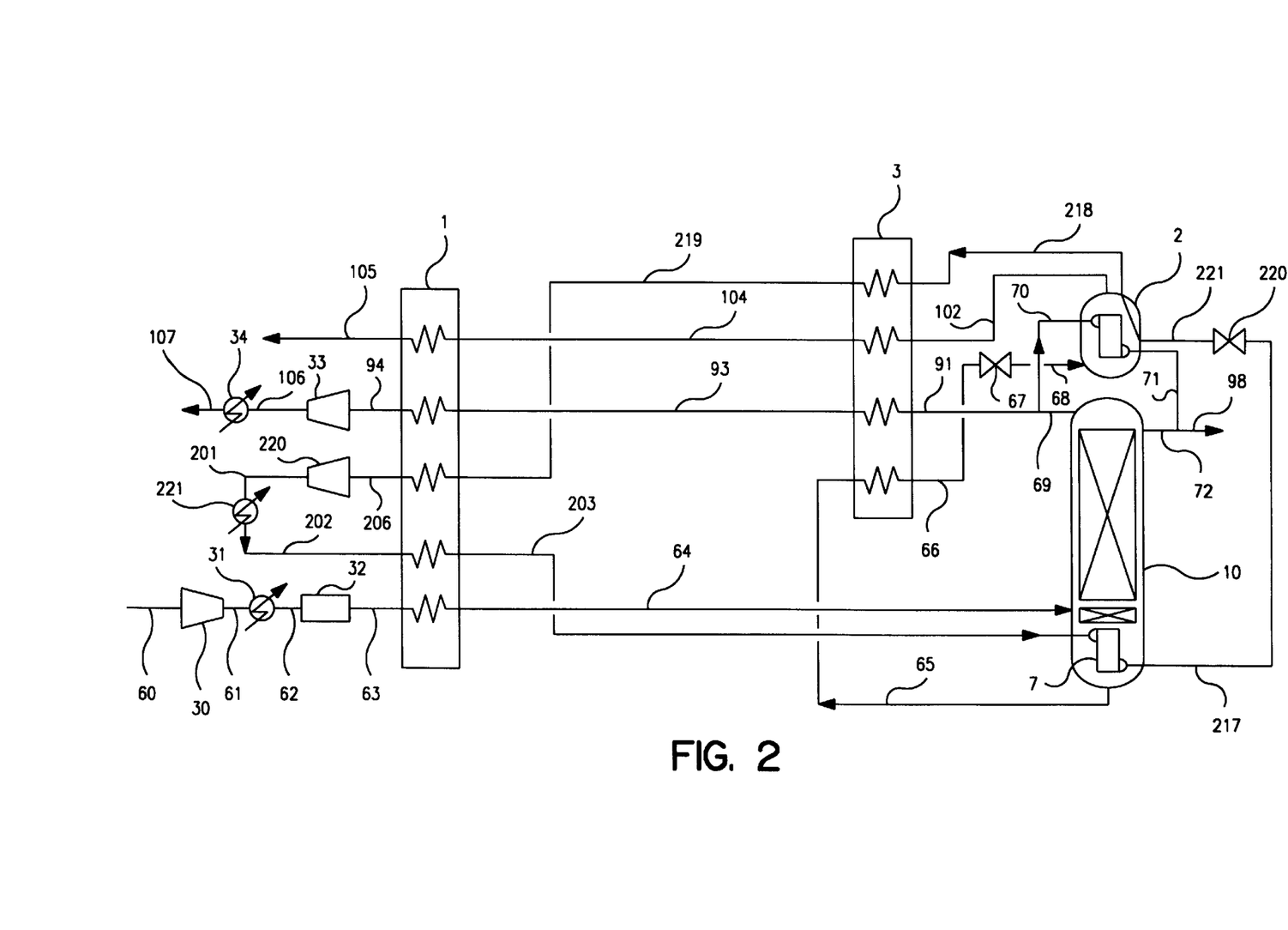
FIG. 2 is a schematic representation of another preferred embodiment of the invention wherein one cryogenic rectification column is used to produce the nitrogen gas and the liquid nitrogen and the multicomponent fluid is additionally used for heat pumping of the column.

FIG. 2 illustrates another embodiment of the invention wherein the multicomponent refrigerant fluid refrigeration generation circuit is integrated with the column. This arrangement enables improved nitrogen recovery although typically a greater amount of power will be needed to operate the refrigeration circuit. The numerals in FIG. 2 are the same as those in FIG. 1 for the common elements, and these common elements will not be described again in detail.

Referring now to FIG. 2, cooled feed air stream 64 is passed directly into column 10. Cooled multicomponent refrigerant fluid in stream 203 is further cooled prior to expansion. In the embodiment illustrated in FIG. 2 this further cooling is effected by indirect heat exchange with column 10 bottom liquid, i.e. oxygen-enriched liquid, in bottom reboiler 7. This further cooling serves to further condense and generally to completely condense stream 203. Liquefied multicomponent fluid is then passed in stream 217 from bottom reboiler 7 to valve 220 wherein it is expanded or throttled to generate refrigeration, and then passed in stream 221 to top condenser 2 wherein it is vaporized. Resulting multicomponent refrigerant fluid is passed from top condenser 2 in stream 218 for warming through heat exchanger 3 and resulting stream 219 is passed to main heat exchanger 1 wherein it is further warmed to effect the cooling of streams 202 and 63 as was previously described.

Figure 3:
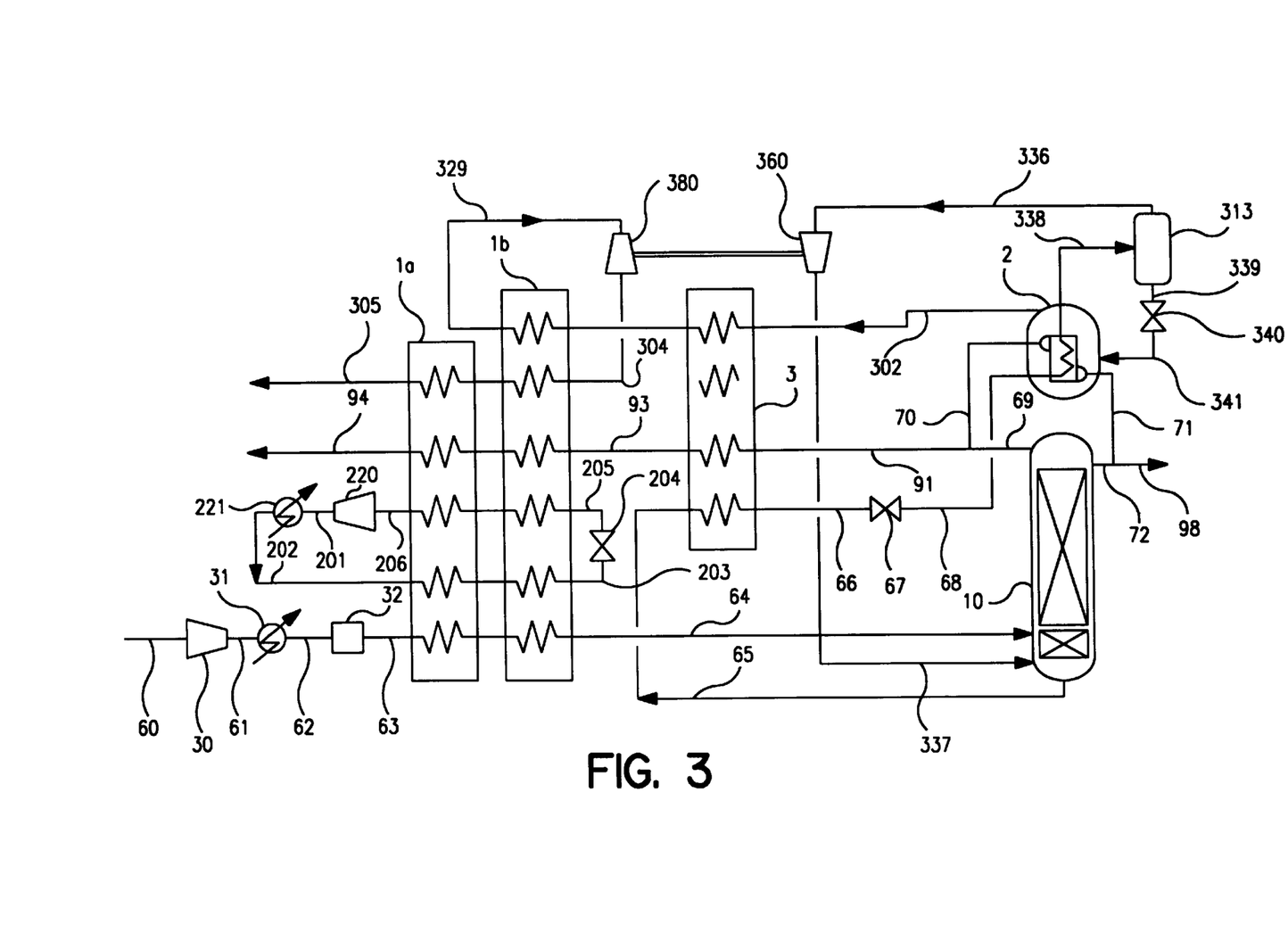
FIG. 3 is a schematic representation of another preferred embodiment of the invention wherein one cryogenic rectification column is used to produce the nitrogen gas and the nitrogen liquid and a portion of the kettle liquid is vaporized, compressed and returned to the column.

FIG. 3 illustrates another preferred embodiment of the invention. The numerals of FIG. 3 are the same as those of FIG. 1 for the common elements, and these common elements will not be described again in detail. In the embodiment illustrated in FIG. 3 the main heat exchanger is shown as being in two parts designated 1a and 1b.

Referring now to FIG. 3, oxygen-enriched liquid 68 is passed through top condenser 2 wherein it is partially vaporized and then passed as two phase stream 333 to phase separator 313 wherein it is separated into a vapor portion and a liquid portion. The vapor portion is withdrawn from phase separator 313 in stream 336, compressed by passage through compressor 360 and then passed in stream 337 into the lower portion of column 10. The remaining liquid portion of the oxygen-enriched liquid is withdrawn from phase separator 313 in stream 339, throttled through valve 340 and as stream 341 passed into top condenser 2 wherein it is vaporized by indirect heat exchange with the second portion of the nitrogen-enriched vapor. Resulting vaporized oxygen-enriched fluid is passed from top condenser 2 in stream 302 through heat exchanger 3 and main heat exchanger part 1b to form stream 329 which is turboexpanded through turboexpander 380 to generate refrigeration. Resulting refrigeration bearing stream 304 is then warmed by passage through main heat exchanger 1a, 1b and then removed from the system in stream 305.

Figure 4:
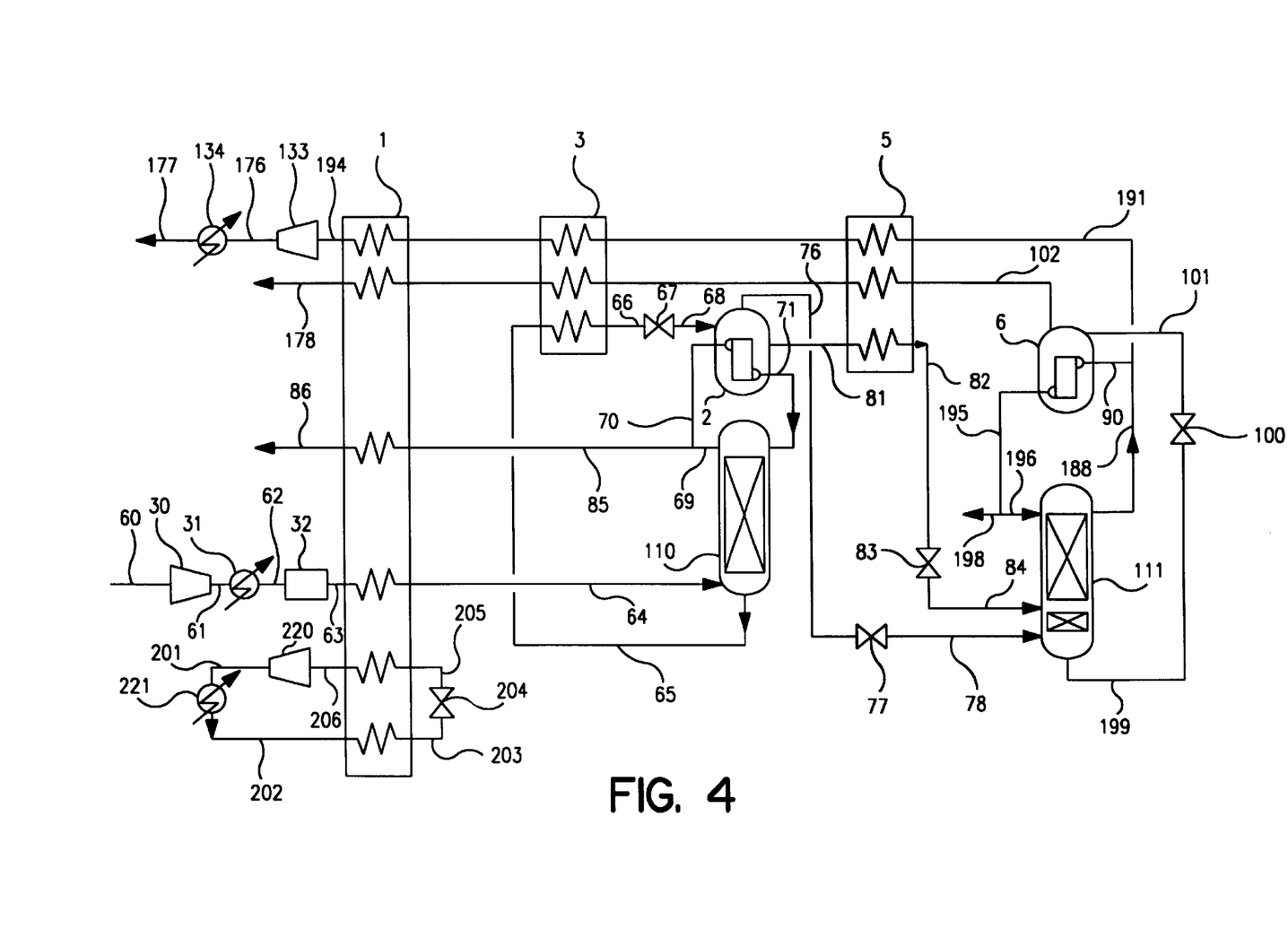
FIG. 4 is a schematic representation of another preferred embodiment of the invention wherein two cryogenic rectification columns are used to produce the nitrogen gas and the liquid nitrogen.

FIG. 4 illustrates another prefeed embodiment of the invention employing two columns wherein the product nitrogen gas may be recovered at two different pressures. The numerals of FIG. 4 are the same as those of FIG. 1 for the common elements and these common elements will not be described again in detail.

Referring now to FIG. 4, the cooled feed air stream 64 is passed directly into first cryogenic rectification column 110 which is operating at a pressure generally within the range of from 100 to 200 psia. If desired, a portion 85 of the nitrogen-enriched vapor is passed through main heat exchanger 1 and recovered as elevated product nitrogen gas in stream 86. The entire nitrogen-enriched liquid in stream 71 is passed to column 110 as reflux. In the embodiment illustrated in FIG. 3, some of the oxygen-enriched liquid passed into top condenser 2 is not vaporized.

Oxygen-enriched vapor from top condenser 2 is passed in stream 76 through valve 77 and as stream 78 into second cryogenic rectification column 111. Remaining oxygen-enriched liquid is withdrawn from top condenser 2 in stream 81 and subcooled by passage through heat exchanger or subcooler 5. Resulting subcooled oxygen-enriched liquid is passed from subcooler 5 in stream 82 through valve 83 and then as stream 84 into second cryogenic rectification column 111 which is operating at a pressure less than that of first cryogenic rectification column 110 and generally within the range of from 30 to 130 psia.

Within column 111 the oxygen-enriched fluid provided into that column is separated by cryogenic rectification into nitrogen-richer fluid and oxygen-richer fluid. Nitrogen-richer fluid is withdrawn from the upper portion of column 111 in gas stream 188 and, if desired, a portion 191 may be warmed by passage through heat exchangers 5, 3 and 1 and recovered as product nitrogen gas in stream 194. If desired stream 194 maybe be compressed by passage through compressor 133, resulting stream 176 cooled in aftercooler 134, and the resulting stream 177 recovered as the product nitrogen gas. Some, or all, of stream 188 is passed into top condenser 6 as stream 90 wherein it is condensed to form nitrogen-richer liquid which is withdrawn from top condenser 6 in stream 195. A portion 198 of stream 195 is recovered as product liquid nitrogen and another portion 196 of stream 195 is passed into column 111 as reflux. Alternatively, nitrogen-richer fluid may be withdrawn from column 111 as liquid, a first portion recovered as product liquid nitrogen, and a second portion pumped and then passed into the upper portion of column 110 as reflux.

Oxygen-richer fluid is withdrawn from the lower portion of second column 111 in liquid stream 199, passed through valve 100 and then as stream 101 is passed into top condenser 6 wherein it is vaporized by indirect heat exchange with the aforesaid condensing nitrogen-richer vapor. Resulting oxygen-richer vapor is withdrawn from top condenser 6 in stream 102, warmed by passage through heat exchangers 5, 3 and 1 and removed from the system as waste stream 178.

The multicomponent refrigerant fluid contains two or more components in order to provide the required refrigeration at each temperature. The optimal choice of refrigerant components will depend on the refrigeration load versus temperature for the particular system. Suitable components will be chosen depending upon their normal boiling points, latent heat, and flammability, toxicity, and ozone-depletion potential.

One preferable embodiment of the multicomponent refrigerant fluid useful in the practice of this invention comprises at least two components from the group consisting of fluorocarbons, hydrofluorocarbons and fluoroethers.

Another preferable embodiment of the multicomponent refrigerant fluid useful in the practice of this invention comprises at least one component from the group consisting of fluorocarbons, hydrofluorocarbons and fluoroethers, and at least one atmospheric gas.

Another preferable embodiment of the multicomponent refrigerant fluid useful in the practice of this invention comprises at least two components from the group consisting of fluorocarbons, hydrofluorocarbons and fluoroethers, and at least two atmospheric gases.

Another preferable embodiment of the multicomponent refrigerant fluid useful in the practice of this invention comprises at least one fluoroether and at least one component from the group consisting of fluorocarbons, hydrofluorocarbons, fluoroethers and atmospheric gases.

In one preferred embodiment the multicomponent refrigerant fluid consists solely of fluorocarbons. In another preferred embodiment the multicomponent refrigerant fluid consists solely of fluorocarbons and hydrofluorocarbons. In another preferred embodiment the multicomponent refrigerant fluid consists solely of fluorocarbons and atmospheric gases. In another preferred embodiment the multicomponent refrigerant fluid consists solely of fluorocarbons, hydrofluorocarbons and fluoroethers. In another preferred embodiment the multicomponent refrigerant fluid consists solely of fluorocarbons, fluoroethers and atmospheric gases.

The multicomponent refrigerant fluid useful in the practice of this invention may contain other components such as hydrochlorofluorocarbons and/or hydrocarbons. Preferably, the multicomponent refrigerant fluid contains no hydrochlorofluorocarbons. In another preferred embodiment of the invention the multicomponent refrigerant fluid contains no hydrocarbons. Most preferably the multicomponent refrigerant fluid contains neither hydrochlorofluorocarbons nor hydrocarbons. Most preferably the multicomponent refrigerant fluid is non-toxic, non-flammable and non-ozone-depleting and most preferably every component of the multicomponent refrigerant fluid is either a fluorocarbon, hydrofluorocarbon, fluoroether or atmospheric gas.

The invention is particularly advantageous for use in efficiently reaching cryogenic temperatures from ambient temperatures. Tables 1–8 list preferred examples of multicomponent refrigerant fluid mixtures useful in the practice of this invention. The concentration ranges given in the Tables are in mole percent.

TABLE 1

| COMPONENT | CONCENTRATION RANGE |
|---|---|
| $C_5F_{12}$ | 5–25 |
| $C_4F_{10}$ | 0–15 |
| $C_3F_8$ | 10–40 |
| $C_2F_6$ | 0–30 |
| $CF_4$ | 10–50 |
| Ar | 0–40 |
| $N_2$ | 10–80 |

TABLE 2

| COMPONENT | CONCENTRATION RANGE |
|---|---|
| $C_3H_3F_5$ | 5–25 |
| $C_4F_{10}$ | 0–15 |
| $C_3F_8$ | 10–40 |
| $CHF_3$ | 0–30 |
| $CF_4$ | 10–50 |
| Ar | 0–40 |
| $N_2$ | 10–80 |

TABLE 3

| COMPONENT | CONCENTRATION RANGE |
|---|---|
| $C_3H_3F_5$ | 5–25 |
| $C_3H_2F_6$ | 0–15 |
| $C_2H_2F_4$ | 0–20 |
| $C_2HF_5$ | 5–20 |
| $C_2F_6$ | 0–30 |
| $CF_4$ | 10–50 |
| Ar | 0–40 |
| $N_2$ | 10–80 |

TABLE 4

| COMPONENT | CONCENTRATION RANGE |
|---|---|
| $CHF_2-O-C_2HF_4$ | 5–25 |
| $C_4H_{10}$ | 0–15 |
| $CF_3-O-C_2F_3$ | 10–40 |
| $C_2F_6$ | 0–30 |
| $CF_4$ | 10–50 |
| Ar | 0–40 |
| $N_2$ | 10–80 |

TABLE 5

| COMPONENT | CONCENTRATION RANGE |
|---|---|
| $C_3H_3F_5$ | 5–25 |
| $C_3H_2F_6$ | 0–15 |
| $CF_3-O-C_2F_3$ | 10–40 |
| $CHF_3$ | 0–30 |
| $CF_4$ | 0–25 |
| Ar | 0–40 |
| $N_2$ | 10–80 |

TABLE 6

| COMPONENT | CONCENTRATION RANGE |
|---|---|
| $C_2HCl_2F_3$ | 5–25 |
| $C_3HClF_4$ | 0–15 |
| $C_2HF_5$ | 10–40 |
| $C_3F_8$ | 0–30 |
| $CF_4$ | 0–25 |
| Ar | 0–40 |
| $N_2$ | 10–80 |

TABLE 7

| COMPONENT | CONCENTRATION RANGE |
|---|---|
| $C_3HCl_2F_3$ | 5–25 |
| $C_3HClF_4$ | 0–15 |
| $CF_3-O-C_2F_3$ | 10–40 |
| $CHF_3$ | 0–30 |

TABLE 7-continued

| COMPONENT | CONCENTRATION RANGE |
|---|---|
| $CF_4$ | 0–25 |
| Ar | 0–40 |
| $N_2$ | 10–80 |

TABLE 8

| COMPONENT | CONCENTRATION RANGE |
|---|---|
| $C_3HCl_2F_3$ | 5–25 |
| $C_2HClF_4$ | 0–15 |
| $C_2H_2F_4$ | 0–15 |
| $C_2HF_5$ | 10–40 |
| $CHF_3$ | 0–30 |
| $CF_4$ | 0–25 |
| Ar | 0–40 |
| $N_2$ | 10–80 |

The invention is especially useful for providing refrigeration over a wide temperature range which encompasses cryogenic temperatures. In a preferred embodiment of the invention each of the two or more components of the refrigerant mixture has a normal boiling point which differs by at least 5 degrees Kelvin, more preferably by at least 10 degrees Kelvin, and most preferably by at least 20 degrees Kelvin, from the normal boiling point of every other component in that refrigerant mixture. This enhances the effectiveness of providing refrigeration over a wide temperature range which encompasses cryogenic temperatures. In a particularly preferred embodiment of the invention, the normal boiling point of the highest boiling component of the multicomponent refrigerant fluid is at least 50° K., preferably at least 100° K., most preferably at least 200° K., greater than the normal boiling point of the lowest boiling component of the multicomponent refrigerant fluid.

Although the multicomponent refrigerant fluid flow circuits illustrated in the Drawings are closed loop single flow circuits, it may be desirable to utilize other flow arrangements. For example, it may be desirable to use multiple independent flow circuits, each with its own refrigerant mixture and process conditions. Such multiple circuits could more readily provide refrigeration at different temperature ranges and reduce refrigerant system complexity. Also, it may be desirable to include phase separations in the flow circuit at one or more temperatures to allow internal recycle of some of the refrigerant liquid. Such internal recycle of the refrigerant liquid would avoid unnecessary cooling of the refrigerant liquid and prevent refrigerant liquid freezing. Preferably the refrigeration generated by the multicomponent refrigeration circuit will be all the refrigeration required to operate the process and generate the desired products. However, refrigeration from other sources, such as from turboexpansion of a process stream, may also be used in the practice of this invention.

The components and their concentrations which make up the multicomponent refrigerant fluid useful in the practice of this invention are such as to form a variable load multimponent refrigerant fluid and preferably maintain such a variable load characteristic throughout the entire temperature range of the method of the invention. This markedly enhances the efficiency with which the refrigeration can be generated and utilized over such a wide temperature range. The defined preferred group of components has an added benefit in that they can be used to form fluid mixtures which are non-toxic, non-flammable and low or non-ozone-depleting. This provides additional advantages over conventional refrigerants which typically are toxic, flammable and/or ozone-depleting.

One preferred variable load multicomponent refrigerant fluid useful in the practice of this invention which is non-toxic, non-flammable and non- ozone-depleting comprises two or more components from the group consisting of $C_5F_{12}$, $CHF_2$—O—$C_2HF_4$, $C_4HF_9$, $C_3H_3F_5$, $C_2F_5$—O—$CH_2F$, $C_3H_2F_6$, $CHF_2$—O—$CHF_2$, $C_4F_{10}$, $CF_3$—O—$C_2H_2F_3$, $C_3HF_7$, $CH_2F$—O—$CF_3$, $C_2H_2F_4$, $CHF_2$—O—$CF_3$, $C_3F_8$, $C_2HF_5$, $CF_3$—O—$CF_3$, $C_2F_6$, $CHF_3$, $CF_4$, $O_2$, Ar, $N_2$, Ne and He.

Another preferred variable load multicomponent refrigerant fluid useful in the practice of this invention which is non-toxic, non-flammable, non-ozone-depleting and having low global warming potential comprises two or more components from the group consisting of $CHCl_2F_3$, $CHF_2$—O—$C_2HF_4$, $C_3H_3F_5$, $C_2F_5$—O—$CH_2F$, $C_3H_2F_6$, $CHF_2$—O—$CHF_2$, $CHClF_4$, $CF_3$—O—$C_2H_2F_3$, $C_3HF_7$, $CH_2F$—O—$CF_3$, $C_2H_2F_4$, $CHF_2$—O—$CF_3$, $C_2HF_5$, $CF_3$—O—$CF_3$, $CHF_3$, $CF_4$, $O_2$, Ar, $N_2$, Ne and He.

Although the invention has been described in detail with reference to certain preferred embodiments, those skilled in the art will recognize that there are other embodiments of the invention within the spirit and the scope of the claims.

What is claimed is:

1. A method for the production of nitrogen gas and liquid nitrogen by the cryogenic rectification of feed air comprising:

(A) compressing a multicomponent refrigerant fluid, cooling the compressed multicomponent refrigerant fluid, expanding the cooled, compressed multicomponent refrigerant fluid, and warming the expanded multicomponent refrigerant fluid by indirect heat exchange with said cooling compressed multicomponent refrigerant fluid and also with feed air to produce cooled feed air;

(B) passing the cooled feed air into a cryogenic rectification column and separating the feed air by cryogenic rectification within the cryogenic rectification column into nitrogen-enriched vapor and oxygen-enriched liquid;

(C) recovering a first portion of the nitrogen-enriched vapor as product nitrogen gas;

(D) condensing a second portion of the nitrogen-enriched vapor to produce nitrogen-enriched liquid; and (E) recovering at least some of the nitrogen-enriched liquid as product liquid nitrogen.

2. The method of claim 1 wherein the condensation of the second portion of the nitrogen-enriched vapor to produce nitrogen-enriched liquid is carried out by indirect heat exchange with oxygen-enriched liquid.

3. The method of claim 1 further comprising further cooling the compressed multicomponent refrigerant fluid prior to the expansion of the multicomponent refrigerant fluid.

4. The method of claim 3 wherein the further cooling of the multicomponent refrigerant fluid is carried out by indirect heat exchange with oxygen-enriched liquid.

5. The method of claim 1 wherein every component of the multicomponent refrigerant fluid is either a fluorocarbon, hydrofluorocarbon, fluoroether or atmospheric gas.

6. The method of claim 1 wherein the oxygen-enriched liquid is partially vaporized to produce a vapor portion and a liquid portion, the liquid portion is vaporized by indirect heat exchanger with the second portion of the nitrogen-enriched vapor to produce the nitrogen-enriched liquid, and the vapor portion is compressed and then passed into the cryogenic rectification column.

7. A method for the production of nitrogen gas and liquid nitrogen by the cryogenic rectification of feed air comprising:

(A) compressing a multicomponent refrigerant fluid, cooling the compressed multicomponent refrigerant fluid, expanding the cooled, compressed multicomponent refrigerant fluid, and warming the expanded multicomponent refrigerant fluid by indirect heat exchange with said cooling compressed multicomponent fluid and also with feed air to produce cooled feed air;

(B) passing the cooled feed air into a first cryogenic rectification column and separating the feed air by cryogenic rectification within the first cryogenic rectification column into nitrogen-enriched vapor and oxygen-enriched fluid;

(C) passing oxygen-enriched fluid into a second cryogenic rectification column and separating the oxygen-enriched fluid within the second cryogenic rectification column by cryogenic rectification into nitrogen-richer fluid and oxygen-richer fluid;

(D) recovering at least some of the nitrogen-richer fluid as product liquid nitrogen; and (E) recovering at least some of at least one of the nitrogen-enriched vapor and nitrogen-richer fluid as product nitrogen gas.

8. The method of claim 7 wherein both nitrogen-enriched vapor and nitrogen-richer fluid are recovered as product nitrogen gas.

9. The method of claim 7 wherein the oxygen-enriched fluid is passed into the second cryogenic rectification column both as a liquid and as a vapor.

10. The method of claim 7 wherein every component of the multicomponent refrigerant fluid is either a fluorocarbon, hydrofluorocarbon, fluoroether or atmospheric gas.

* * * * *